May 19, 1931. R. M. LYNN ET AL 1,806,356

METHOD AND APPARATUS FOR TREATING MOTOR FUEL

Filed Oct. 26, 1929

Inventors
Ross M. Lynn,
William M. Malouf,

By Cushman Bryant Derby
Attorneys

Patented May 19, 1931

1,806,356

UNITED STATES PATENT OFFICE

ROSS M. LYNN AND WILLIAM M. MALOUF, OF SALT LAKE CITY, UTAH, ASSIGNORS TO ATOMIC POWER CORPORATION, OF SALT LAKE CITY, UTAH, A CORPORATION OF DELAWARE

METHOD AND APPARATUS FOR TREATING MOTOR FUEL

Application filed October 26, 1929. Serial No. 402,760.

The subject matter of the present application is an improvement upon the invention of an earlier case, Serial No. 322,913, and relates to improvements in the means for treating motor fuel described in said earlier application.

In the former case we have pointed out the importance of subjecting a fuel stream to the action of a freely movable agitating device arranged within a fuel stream conduit.

For purposes of illustration, an embodiment of the invention particularly designed for use with the supply conduit of an internal combustion engine manifold will be hereinafter described and is illustrated in the accompanying drawings.

Figure 1:
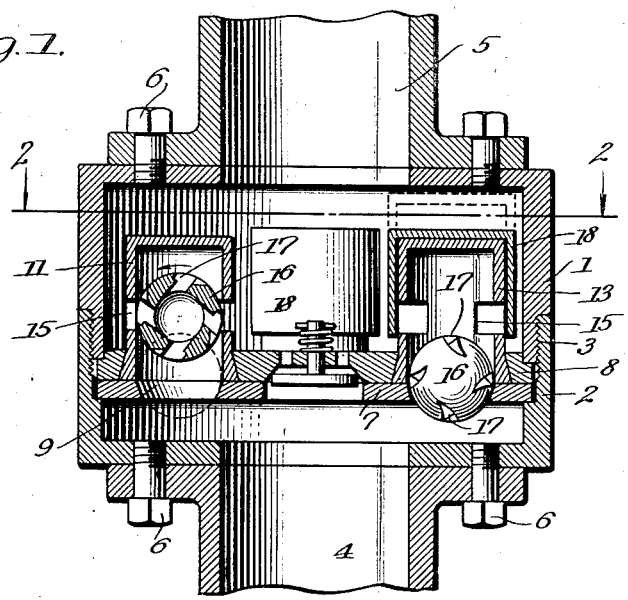
Figure 1 is a sectional view, substantially on the line 1—1 of Figure 2, longitudinally of a fuel supply conduit.
Figure 2:
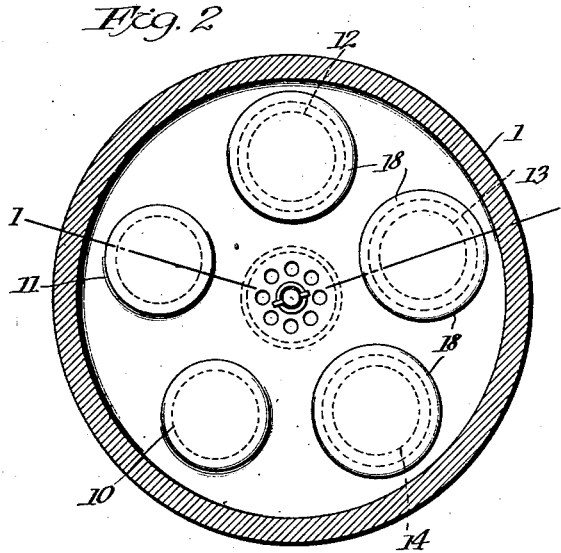
Figure 2 is a transverse section, substantially on the line 2—2 of Figure 1.
Figure 3:
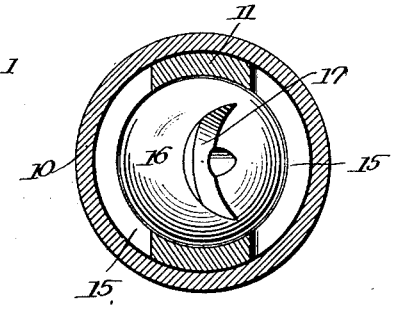
Figure 3 is a detail, on an enlarged scale, in a plane substantially parallel to that of Figure 2.

Referring to the drawings, the embodiment of the invention illustrated is shown as arranged within a hollow body comprising two members 1, 2, shown as connected by a threaded joint 3, and secured between the adjacent ends of conduit sections 4, 5, which, for purposes of illustration and description, may be assumed to be parts of a conduit connecting a suitable carburetor and engine intake manifold, not shown.

Bolts 6 are shown as detachably connecting the several parts, but any other suitable means which will permit the unitary structure comprising the members 1, 2, and parts enclosed therein to be applied to or detached from a fuel stream supply conduit may be employed.

7 designates a transverse partition which is shown as resting on a suitable seat formed on the member 2 and held in place by a gasket 8 and the inner end of the member 1.

A plurality of ports 9 in the partition 7 serve to establish communication between the conduit sections 4, 5, when the motor is operating. On the discharge face of the partition 7 about each of the ports 9 therein is suitably secured a casing, which is closed at its upper end and at its lower end communicates with the port about which it is secured. In the particular embodiment of the invention illustrated, such casings are designated 10, 11, 12, 13 and 14, and each of them has a plurality of outlets or ports 15 formed in its side wall, so that the fuel stream entering the port 9 of any particular casing may pass outward through said ports 15 to the conduit section 5.

As shown, each casing is provided with two ports 15 arranged at diametrically opposite points. Within each of the casings 10—14 is arranged an agitating device 16, preferably in the form of a hollow sphere provided with a plurality of peripheral abutments formed by suitable notches that communicate with apertures leading to the interior of the body. It will be seen that the peripheral notches or recesses in the spherical bodies are of such form as to provide abutments 17 facing in a direction opposing the flow of the fuel stream through the casing 10, and, therefore, under the impact of the stream induced by engine suction or by pressure, the body 16 will be caused to rotate and break up the stream passing through the enclosing casing.

The function of the particular form of agitating device shown, which, it will be noted, is freely supported by the fuel stream when the latter is passing through the casing, and is not connected by any fixed trunnions or bearings with the enclosing casing, is set forth in detail in the earlier application before referred to.

It will be seen that the partition 7 acts to subdivide the main fuel stream into a plurality of sub-streams, and that one of the agitating devices referred to is associated with each sub-stream, so as to effect a very thorough breaking up or atomization of the fuel stream.

When the motor is not operating and no suction is being exerted thereby through the fuel supply conduit, or the fuel stream is not being forced through such conduit by pressure, the agitating devices will be seated in the ports 9 of the partition 7, as represented at the right hand side of Figure 1. When, however, the engine is operating, the agitating devices will tend to rise into substantially the position shown at the left of Figure 1, provided the ports 15 in the several casings are open.

One feature of the present invention comprises providing means whereby the ports 15 of certain of the casings will be automatically closed and opened in accordance with variations in the total volume of the fuel stream discharged by the conduit.

As shown, all but two of the casings are provided with closures for the ports 15, such closures being shown as having the form of sleeves 18 closed at one end and of sufficient length to extend across the ports 15 when the closed end bears upon the upper end of the associated housing.

No closures are provided for the casings 10, 11, and these are designed to supply the necessary volume of fuel to the motor when the same is "idling". As the suction of the motor increases, the effect will be to raise the sleeve-like closures 18 of the casings 12, 13 and 14, and permit additional subdivided fuel streams to pass into the conduit section 5.

Preferably, the several closures 18 will be of different weights so that they will be successively moved to position to open the ports 15 controlled thereby as the suction of the motor increases.

It is believed that the operation and advantages of the invention wll be readily appreciated from the foregoing description in connection with the drawings, and it is to be understood, of course, that the latter are primarily to be considered as illustrative, rather than restrictive of the invention. The form of the peripheral abutments on the, preferably, spherical, agitating device may be differently shaped and some other form of automatically actuating closure means for the ports 15 might be provided.

The particular embodiment of the invention illustrated is one which has been found to operate satisfactorily and efficiently, and, at the present time, is the preferred construction.

We claim:

1. In a fuel stream conduit, means for subdividing a fuel stream passing through the conduit into a plurality of sub-streams, rotary means for agitating each of said sub-streams, and means for varying the number of sub-streams in accordance with variations in the volume of the total fuel stream.

2. In a fuel stream conduit, means for subdividing the fuel stream passing through the conduit into a plurality of sub-streams, rotary means for agitating each of said sub-streams, and means for varying the number of sub-streams in accordance with variations in the total volume thereof, said last mentioned means comprising a plurality of control valves adapted to cut each sub-stream adjacent said agitating means for such sub-stream.

3. In a fuel stream conduit, means for subdividing the fuel stream passing through the conduit into a plurality of sub-streams, rotary means for agitating each of said sub-streams, and means for varying the number of sub-streams in accordance with variations in the total volume thereof, said last mentioned means comprising a plurality of suction controlled valves each adapted to interrupt the flow of one of the sub-streams adjacent said agitating means for said sub-stream.

4. The method of improving a fuel mixture which consists in subdividing a fuel stream, subjecting the individual subdivisions of said stream to the action of rotary agitating devices, and varying the number of subdivisions of the stream in accordance with variations in the volume or velocity of the total stream.

5. The method of improving a fuel mixture which consists in subjecting a fuel stream to the action af a plurality of rotary agitating devices adapted to be independently moved into and out of operation, and varying the number of agitating devices in operation in accordance with variations in the volume of the fuel stream.

6. In a fuel stream conduit, a plurality of independent, substantially spherical shaped, agitating devices adapted to be rotated by direct impact of the fuel stream, and means for automatically rendering certain of said devices operative or inoperative in accordance with variations in the volume of the fuel stream delivered from the conduit.

7. In a fuel stream conduit, a partition extending transversely across the interior of the conduit and provided with a plurality of ports, whereby the fuel stream will be subdivided in passing the partition, apertured casings at the discharge side of the partition and severally communicating with the ports therein, an agitating means within each casing adapted to be rotated by the flow of the fuel stream through the communicating partition port, and closures for the ports of one or more of the casings adapted to be moved to and from operative position in accordance with variations in the volume of the fuel stream discharged by the conduit.

8. In a fuel stream conduit, a partition extending transversely across the interior of the conduit and provided with a plurality of ports, whereby the fuel stream will be subdivided in passing the partition, apertured casings at the discharge side of the partition and severally communicating with the ports therein, an agitating means within each casing adapted to be rotated by the flow of the fuel stream through the communicating partition port, and sleeve-like closures for the ports or one or more of the casings adapted to be moved to and from operative position in accordance with variations in the volume of the fuel stream discharged by the conduit.

9. In a fuel stream conduit, a partition extending transversely across the interior of the conduit and provided with a plurality of ports, whereby the fuel stream will be subdivided in passing the partition, casings at the discharge side of the partition each having one end in communication with a port in the partition and provided with an outlet in a side wall, an agitating means within each casing adapted to be rotated by the fuel stream passing from the partition port to said outlet, and closures for the outlets of one or more of said casings adapted to be moved to and from operative position in accordance with variations in the volume of the fuel stream discharged by the conduit.

10. A means for conducting a fuel stream between a carburetor and an engine intake manifold, comprising in combination a plurality of tubular members each adapted to have a portion of the maximum fuel stream pass therethrough, means within each of said members for effecting a thorough mixing of the particles of the stream passing therethrough, and means for controlling the flow of fuel through certain of said members in accordance with variations in the total volume of the fuel stream.

11. A means for conducting a fuel stream between a carburetor and an engine intake manifold, comprising in combination a plurality of tubular members each adapted to have a portion of the maximum fuel stream pass therethrough, each of said members having an inlet port and an outlet port, means within each of said members for effecting a thorough mixing of the particles of the stream passing therethrough, and means for controlling the flow of fuel through the outlet ports of certain of said members in accordance with variations in the total volume of the fuel stream.

12. A means for conducting a fuel stream between a carburetor and an engine intake manifold, comprising in combination a plurality of tubular members each adapted to have a portion of the maximum fuel stream pass therethrough, each of said members having an inlet port at one end and an outlet port formed in a side wall, means within each of said members for effecting a thorough mixing of the particles of the stream passing therethrough, and sleeve-like closures for the outlet ports of certain of said members adapted to open and close the associated ports in accordance with variations in the total volume of the fuel stream.

In testimony whereof we have hereunto set our hands.

ROSS M. LYNN.
WILLIAM M. MALOUF.